Figure 1:
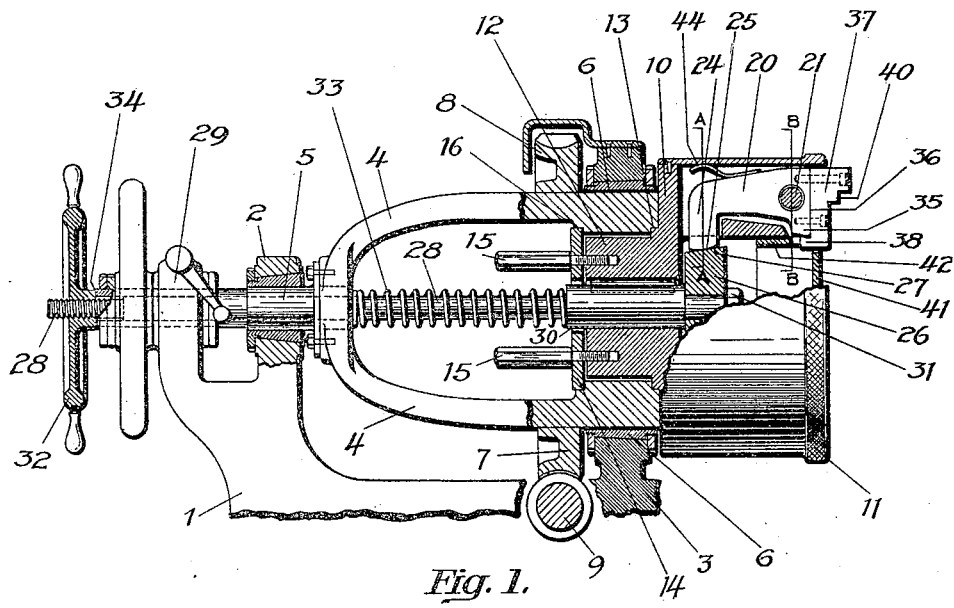

H. C. HOOK.
SECOND OPERATION CHUCK.
APPLICATION FILED APR. 20, 1918.

1,374,083.

Patented Apr. 5, 1921.

Witnesses
L. F. Butterfield
N. O. Hayward

INVENTOR
HENRY C. HOOK
BY
Clayton L. Jenks
ATTORNEY

UNITED STATES PATENT OFFICE.

HENRY C. HOOK, OF WORCESTER, MASSACHUSETTS, ASSIGNOR, BY MESNE ASSIGNMENTS, TO NORTON COMPANY, OF WORCESTER, MASSACHUSETTS, A CORPORATION OF MASSACHUSETTS.

SECOND-OPERATION CHUCK.

1,374,083. Specification of Letters Patent. Patented Apr. 5, 1921.

Application filed April 20, 1918. Serial No. 229,818.

*To all whom it may concern:*

Be it known that I, HENRY C. HOOK, a citizen of the United States of America, residing at Worcester, in the county of Worcester and State of Massachusetts, have invented certain new and useful Improvements in Second-Operation Chucks, of which the following is a full, clear, and exact specification.

My invention relates to chucks and more particularly to second operation production chucks adapted to hold and center work which is to be machined during rotation thereof.

It has heretofore been found necessary in utilizing the types of chucks now on the market to machine a body completely in one setting in the chuck from the rough to the final finishing stages when possible and it has not been feasible to perform one operation on one machine and another on a second machine, because the work could not be taken out of the first chuck and replaced in the second in exactly the same concentric position with a sufficient degree of accuracy. This inaccuracy was caused by the fact that the chuck did not hold the work rigidly and correctly centered at all times and because in such former types there have been too many chances for backlash, improper wear, binding of movable parts, and so forth, all tending, because of such faulty design, to prevent accurate and duplicate settings of work in the chuck.

It is accordingly an object of my invention to provide a chuck and its associated parts in a machine which will permit of work being accurately positioned and centered and the operation repeated indefinitely, so that duplicate pieces may be correctly located one after the other without variation in position.

A further object is to provide means whereby the work-holding jaws may be moved accurately and with fine precision to engage the work with a proper degree of pressure and to hold the same rigidly without chances for shifting or vibration during grinding or other treatment of the work being rotated.

Another object is to provide means for preventing the accumulation of dust or other foreign objects within the chuck, which would cause wear or affect the relative location of cam surfaces or movable parts controlling the movement of the chuck jaws.

A still further object is to provide carefully trued surfaces and bearings for the movable chuck parts so that great rigidity and strength is obtained and all parts are held properly in position for an indefinite period, and so that unnecessary frictional wear is eliminated and the whole mechanism is forced to move with precision and accuracy during its operation.

With these and other objects in view, as will appear from the following disclosure, my invention resides in the combination of parts set forth in the specification and covered by the claims appended hereto.

Figure 2:
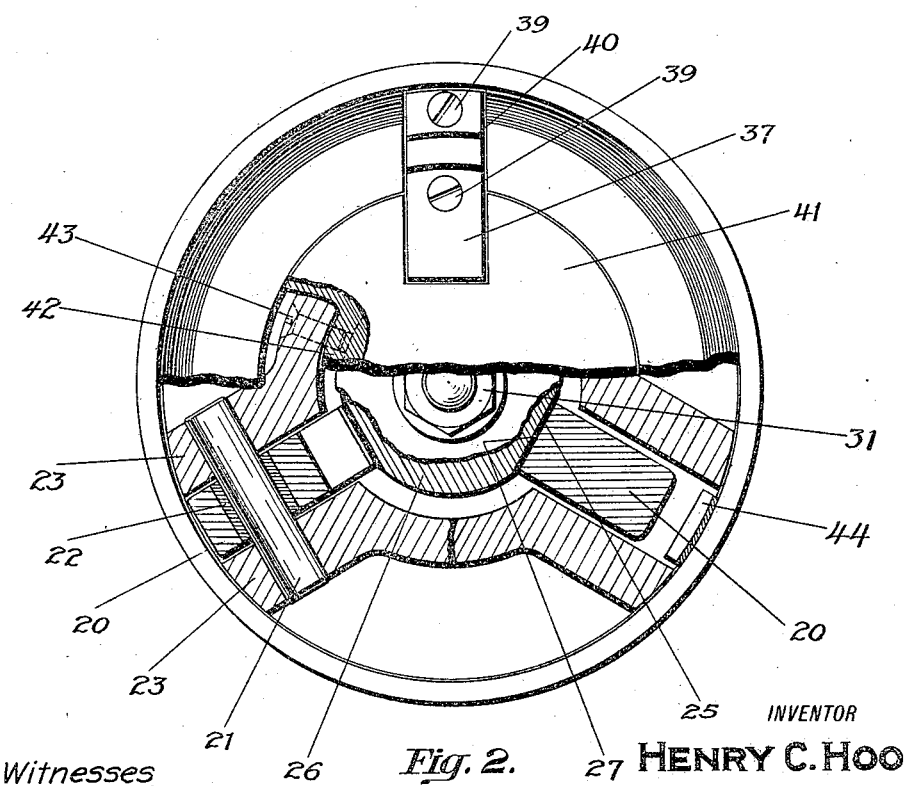

Reference being had to the drawings, in which like reference numerals indicate like parts:

Figure 1 is an elevation, partly in section, of my chuck as applied to a well known type of machine; and Fig. 2 is an end view of the chuck, showing in the lower right hand portion a section taken through a jaw arm corresponding with a view on the line *a—a* of Fig. 1, and in the lower left hand portion a section through the pivot bearings corresponding with line *b—b* of Fig. 1.

I have illustrated in the drawings a specific application of one form of chuck as applied to a well known machine now on the market, for use in milling operations. Only so much of the machine as is necessary to illustrate the relation of my invention to its associated part is here shown. It, as illustrated, may comprise a supporting framework 1, provided with bearing supports 2 and 3 for holding the work-driving head and supporting the chuck.

In the present instance the driving head may comprise the hollow framework 4 having a spindle 5 at one end supported in the bearing 2, and a cylindrical bearing surface 6 carried in the bearing 3. A ring 7 fixed to the framework 4 has gear teeth 8 thereon which mesh with a suitable driving worm 9, whereby the frame may be rotated.

In order that work to be machined may be accurately centered relative to the axis of rotation, I provide a chuck mechanism which is carried and rotated by the frame 4. The chuck body comprises a rear wall 10 which carries a cylindrical casing 11, the wall 10 being in the form of a flanged plate having a large central projection 12 extending rearwardly. The rear of the wall 10 has an annular shoulder 13 which engages a groove on the front of the framework 4. A clamping plate 14 is adjustably attached to the projection 12 by means of screws 15 and engages a groove 16 on the framework 4, whereby, upon turning up screws 15, the body 10 may be firmly clamped to the frame and the chuck body and the frame may rotate together.

In the chuck as illustrated, I have provided a three-point suspension for the work to be machined and I have furthermore provided means for moving the work supports with fine precision for a short distance, just sufficient to permit removal and insertion of work of substantially uniform size. In the second machining operation which may be carried on by means of my chuck, measurement of the work is made to a fraction of a thousandth of an inch. If there is any slight movement or variation in the position of a part of the chuck, noticeable effects will appear in the work being treated. In order to hold the work and prevent undesired movements and in order that work may be accurately positioned the second time in its original position, and such steps repeated indefinitely, it is necessary that the device be simply constructed as well as correctly designed and have a minimum number of wearing surfaces, and that it be possible to move the jaws with accuracy and always to the same extent.

To these ends, I find it feasible to carry the work holding jaws on pivoted arms which are rotated on their pivots by a cam device actuated by a fine precision screw mechanism. As illustrated, the work is supported by means of three levers or arms 20 having hardened bearings 22 pivotally mounted on pivots 21, which are supported in lugs 23 projecting from the inner wall of the chuck body. The bearing surfaces of the pivots 21 are also made of hard material so as to give the minimum of wear. Each arm 20, in the present embodiment, is somewhat of an L shape and has at its rearward end an inwardly projecting lug 24 provided with a slightly curved surface 25 of hardened metal, adapted to engage a cam. The three arms, their bearings and their cam-engaging surfaces are carefully formed in order to be exactly of the same size or to coöperate accurately with an operating cam member so as to give equal movements to the outer jaws.

In order to move the three jaws simultaneously and to an equal extent, I provide a cam member 26 having three cam faces 27 engaging the surfaces 25 of lugs 24. The cam faces 27, as shown, slope rearwardly and may be conical in shape so that rearward movement of the cam member 26 will move the lugs 24 of the arms 20 outwardly and give a closing movement to the outer work-holding jaws. It is highly necessary that this cam member 26 be supported rigidly and immovably except longitudinally of its axis. To this end I provide a spindle 28, which projects through centrally disposed openings in the member 12, the spindle 5 of the frame 4, and a further supporting member 29 on the framework 1. The spindle 28 is provided with an enlarged portion 30, preferably of hardened metal, which is keyed within the member 12 and fits therein with slidable accuracy. The spindle has a similarly accurate fit where it passes through the other bearings 5 and 29, whereby it is held rigidly and cannot move the cam surfaces 27 other than parallel with themselves. The cam member 26 may be secured on the outer projecting end of the spindle and held in place by a nut 31 or other suitable means.

In order to move the spindle longitudinally, I provide a fine precision screw mechanism comprising, in the present instance, a hand-operated wheel 32, internally screw-threaded and coöperating with threads on the rear end of the spindle 28. A spring 33 tends to thrust the cam member 26 forwardly so that a shoulder 34 on the wheel 32 is brought into engagement with the outer end of spindle 5 projecting through the main bearings of the machine. By this means, rotation of wheel 32 moves the cam member 26.

While the work-holding jaws may be formed directly on the ends of the lever arms 20, I prefer to have separate, removable jaws in order that different shapes and sizes may be utilized corresponding with the work to be treated. In order that these jaws may be accurately located, I provide two carefully machined plane surfaces 35 and 36 on the front and under side of each of the pivoted arms 20, these being made as nearly duplicate as possible so that the jaw members 37 which fit thereagainst may be interchangeable. Each detachable jaw member 37 has a projecting lug 38 and plane surfaces on the lug and the rear face of the member which correspond exactly in angular relation with the faces 35 and 36, whereby the jaw members may be fitted snugly and accurately in place. These detachable parts are secured to the arms 20 by means of screws 39. Shoulders 40 are provided for clamping the work therebetween.

In order to keep dust from the device, I provide the casing 11 as described, and a cover plate 41 which fits closely around the jaws and within the casing wall. This plate 41 may be fixed to a cylindrical part 42 projecting into the casing and fastened thereto by a screw 43. By this means I keep all the wear-receiving parts closed in and free from dust or other foreign bodies, so that there can be no undesirable wearing action on the carefully machined cam surfaces, which would cause lost motion or undesired play in the movable parts and prevent the chuck moving accurately and with precision every time that it is operated.

The operation of this chuck mechanism is obvious from the above disclosure. When it is desired to put a new machine part in the chuck for the first time, suitable jaw members 37 are selected and placed on the arms 20, to which they are fastened by screws 39. The three detachable jaw members are then milled to form the shoulders 40 thereon, of the right size to engage the work so that but little play or movement is necessary to clamp them against the work. The engaging shoulders 40 are thus fashioned to constitute arcs of a circle concentric with the axis of the chuck, and they may be quite accurately made in this manner. By turning the hand wheel 32 the cam member 26 is permitted to slide forward and the jaws to open. To close the jaws, the hand wheel 32 is turned in the reverse direction and the shoulders 40 are brought into a clamping engagement with the work with a precise movement. In a machine accurately constructed for precision or second operation production work, the cam member 26 need be moved not much more than 0.020" to open a jaw a similar distance of 0.020." At the same time the movement on the pivot spindles 21 is considerably less; hence there is but slight wear on these movable parts and the chuck will not change to any material extent in long continued use. Due to the accuracy with which the parts are fitted and the simple construction and unique design of my chuck, it can be seen that the cam members must move with precision and always to the same extent for a given movement of the hand wheel 32, and that work may be held in correct position for machining and centered repeatedly without elaborate effort. A spring 44 carried on the outer side of each arm engages the casing 11 and holds the cam surfaces 25 and 27 in constant engagement.

I claim as my invention:

1. In a precision chuck, a casing, pivoted arms therein, work-holding jaw members rigidly located on the outer ends of the arms and projecting beyond said casing to readily engage the work, precision operated cam mechanism coöperating with the arms to tilt the jaws and means comprising a closure for the end of said casing and coöperating therewith to exclude dust from the cam mechanism at all times.

2. In a precision chuck, a rigid body, arms on the body, work-holding jaws rigidly mounted on the outer ends of the arms, pivots carried by said body for supporting the arms, a spindle axially mounted on the body for longitudinal movement only, a cam member rigidly mounted on the spindle engaging a face on each of the arms and adapted to move them simultaneously and equally, a cylindrical bearing support for said spindle, and fine precision means for moving the cam and actuating the jaws to center successive pieces of work.

3. In a precision chuck, a rigid casing, a closure plate therefor having openings therethrough, arms pivotally mounted within the casing and projecting through said openings and provided with cam following surfaces on the inner ends thereof, work clamping jaws rigidly fixed on the outer ends of the arms, a cam member engaging said surfaces and adapted to move the jaws equally, a spindle movably supporting said cam member, a bearing for the spindle permitting only longitudinal movement thereof and fine precision mechanism for moving the spindle and cam and thereby clamping the work in place.

4. In a precision chuck, a rigid body having a rear wall, a peripheral wall forming a casing, a cover plate closing the front of the casing having radial slots therein, arms pivotally mounted on the body and projecting through the radial slots, and provided with cam follower surfaces on the inner ends thereof, jaws for clamping the work rigidly fixed on the outer ends of the arms, an extensive bearing support axially located in the rear wall, a spindle accurately mounted therein for longitudinal movement only, a cam on the spindle engaging said cam follower surfaces and adapted to move the jaws simultaneously and equally to clamp work in place and fine precision means for moving the cam longitudinally.

5. In a chuck, a substantially dust-proof and rigid casing, three arms pivotally mounted therein having cam surfaces at their inner ends disposed in a circle about the chuck axis and jaw-locating surfaces at the outer ends exterior of the casing, a work-holding jaw member accurately positioned and rigidly fixed on each arm relative to said locating surface, a centrally disposed cam member within the casing having axially equidistant cam surfaces engaging said arm surfaces and adapted upon longitudinal movement to tilt the arms equally and clamp the jaws against and center the work, an extensive cylindrical bearing accurately supporting said cam member and permitting only longitudinal movement thereof, and fine precision, positively actuated mechanism for moving said cam member.

Signed at Worcester, Massachusetts, this 18th day of April, 1918.

HENRY C. HOOK.